US012601866B2

(12) United States Patent
Koo et al.

(10) Patent No.: US 12,601,866 B2
(45) Date of Patent: Apr. 14, 2026

(54) POLARIZING PLATE AND OPTICAL DISPLAY DEVICE COMPRISING SAME

(71) Applicant: SAMSUNG SDI CO., LTD., Yongin-si (KR)

(72) Inventors: Jun Mo Koo, Suwon-si (KR); Jung Hun You, Suwon-si (KR); Sang Hum Lee, Suwon-si (KR); Bong Choon Kim, Suwon-si (KR); Dong Yoon Shin, Suwon-si (KR)

(73) Assignee: Wuxi Hengxin Optoelectronic Materials Co., Ltd., Wuxi (CN)

( * ) Notice: Subject to any disclaimer, the term of this patent is extended or adjusted under 35 U.S.C. 154(b) by 638 days.

(21) Appl. No.: 17/904,776

(22) PCT Filed: Feb. 10, 2021

(86) PCT No.: PCT/KR2021/001813
§ 371 (c)(1),
(2) Date: Aug. 22, 2022

(87) PCT Pub. No.: WO2021/182758
PCT Pub. Date: Sep. 16, 2021

(65) Prior Publication Data
US 2022/0413199 A1      Dec. 29, 2022

(30) Foreign Application Priority Data
Mar. 9, 2020      (KR) ........................ 10-2020-0029277

(51) Int. Cl.
*G02B 5/30*      (2006.01)
*G02B 1/14*      (2015.01)
(52) U.S. Cl.
CPC ............. *G02B 5/3025* (2013.01); *G02B 1/14* (2015.01)

(58) Field of Classification Search
CPC ...... G02B 5/3025; G02B 1/14; G02B 5/3033; G02B 5/30
See application file for complete search history.

(56) References Cited

U.S. PATENT DOCUMENTS 5,926,310 A * 7/1999 Tamura ................ G02B 5/3033
351/44
6,606,136 B2 * 8/2003 Matsumoto .......... G02B 5/3033
359/487.04
(Continued)

FOREIGN PATENT DOCUMENTS

CN      103097927 A      5/2013
CN      105229505 A      1/2016
(Continued)

OTHER PUBLICATIONS

Korean Office Action dated Jan. 19, 2023 issued in corresponding Korean Patent Application No. 10-2020-0029277 (4 pages).
(Continued)

*Primary Examiner* — Balram T Parbadia
(74) *Attorney, Agent, or Firm* — Ricky Lam

(57)      ABSTRACT

Provided are: a polarizing plate comprising a polarizer, and a protective layer formed on at least one surface of the polarizer, and an optical display device comprising same. The polarizing plate comprises a first area and second area which are in an image display area, wherein the first area and second area have mutually different light transmittances at the same wavelength, the first area has a light transmittance of approximately 50% to 80%, and the first area has a color value a* of approximately −13 to 2, and a color value b* of approximately 1 to 35.

12 Claims, 2 Drawing Sheets

(56)  References Cited

U.S. PATENT DOCUMENTS

| | | | | |
|---|---|---|---|---|
| 2004/0114248 | A1* | 6/2004 | Hokazono | G02B 1/14 |
| | | | | 359/603 |
| 2009/0296190 | A1* | 12/2009 | Anderson | B60R 1/088 |
| | | | | 156/60 |
| 2013/0010236 | A1 | 1/2013 | Nam et al. | |
| 2015/0160390 | A1 | 6/2015 | Goyal et al. | |
| 2016/0195653 | A1* | 7/2016 | Lee | G02B 5/305 |
| | | | | 427/163.1 |
| 2016/0195767 | A1* | 7/2016 | Lee | B29C 71/04 |
| | | | | 359/486.01 |
| 2016/0299271 | A1 | 10/2016 | Lee et al. | |
| 2017/0090086 | A1* | 3/2017 | Goto | C09D 129/04 |
| 2017/0090087 | A1* | 3/2017 | Goto | C09D 129/04 |
| 2018/0203174 | A1 | 7/2018 | Lee et al. | |
| 2019/0025487 | A1 | 1/2019 | Nam et al. | |
| 2019/0346605 | A1* | 11/2019 | Nevitt | B32B 7/023 |
| 2020/0225395 | A1* | 7/2020 | Ogomi | G02B 5/3033 |
| 2022/0286590 | A1* | 9/2022 | Seo | H04M 1/02 |

FOREIGN PATENT DOCUMENTS

| | | | |
|---|---|---|---|
| CN | 108603966 | A | 9/2018 |
| JP | 2014-081482 | A | 5/2014 |
| JP | 6086117 | B2 | 3/2017 |
| JP | 2019-086622 | A | 6/2019 |
| KR | 10-2015-0111871 | A | 10/2015 |
| KR | 10-2018-0083761 | A | 7/2018 |
| KR | 2019-0109366 | A | 9/2019 |
| WO | WO 2016-108632 | A1 | 7/2016 |

OTHER PUBLICATIONS

Chinese Office Action dated Jan. 23, 2024 issued in corresponding Chinese Patent Application No. 202180020007.8 (6 pages).

International Search Report of PCT/KR2021/001813, May 20, 2021, 6 pp.

* cited by examiner

【FIG. 1】
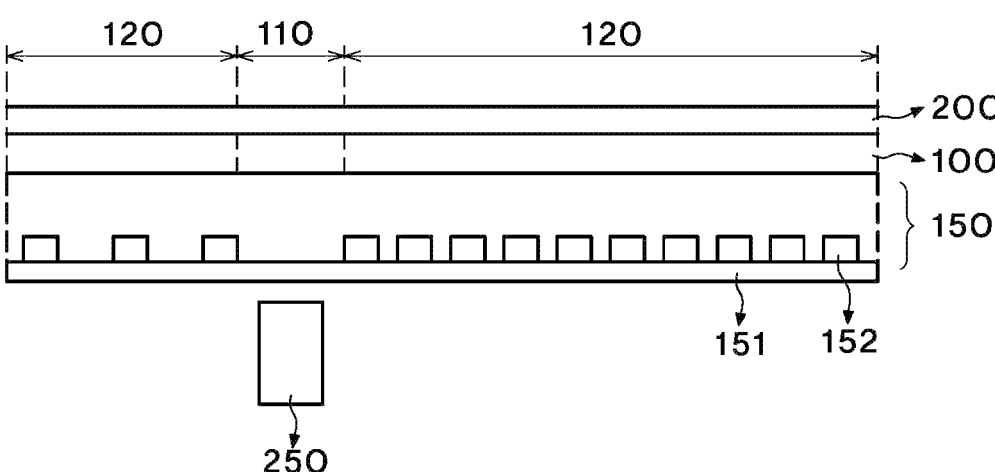
【FIG. 2】
(A)
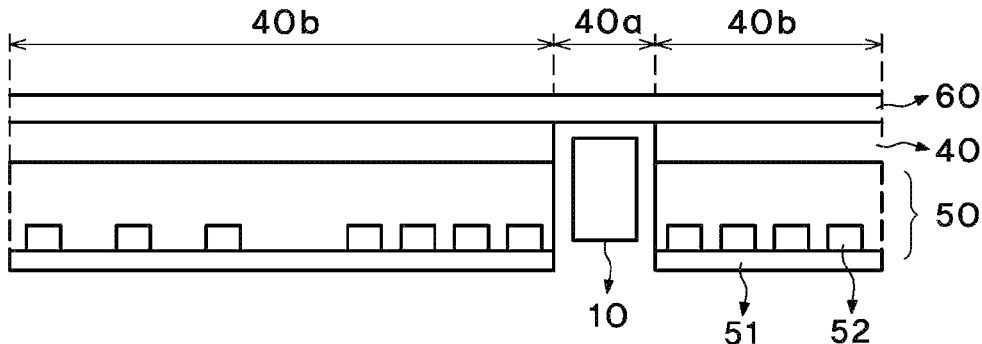
(B)
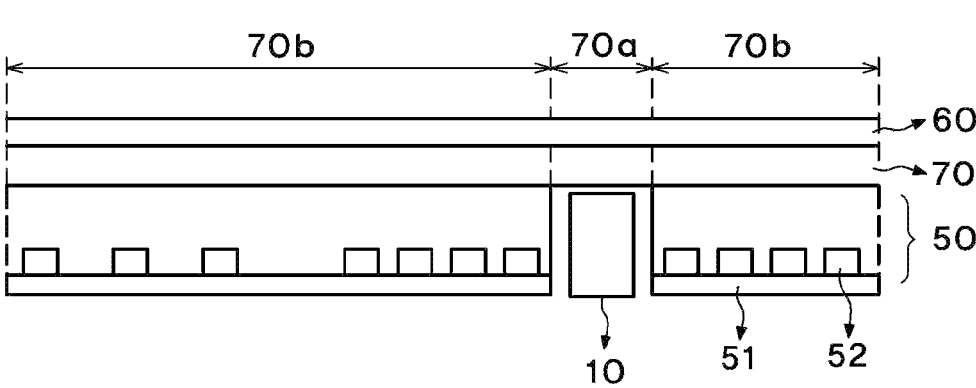

【FIG. 3】
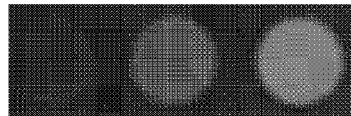

POLARIZING PLATE AND OPTICAL DISPLAY DEVICE COMPRISING SAME

CROSS-REFERENCE TO RELATED APPLICATIONS

This application is a U.S. National Phase Patent Application of International Application Number PCT/KR2021/001813, filed on Feb. 10, 2021, which claims priority to Korean Patent Application Number 10-2020-0029277, filed on Mar. 9, 2020, the entire content of each of which is incorporated herein by reference.

TECHNICAL FIELD

The present invention relates to a polarizing plate and an optical display device including the same.

BACKGROUND ART

A polarizing plate is provided to an optical display device to display an image or to improve image quality. In a mobile display, such as a mobile phone and the like, the polarizing plate may be used as an intermediate path for an image sensor, such as a camera and the like, to photograph a picture or an image.

Referring to FIG. 2(A), an optical display device includes a display panel 50, which includes a base layer 51 and a plurality of light emitting diodes 52, a polarizing plate 40 formed on the display panel 50, a cover glass 60 formed on the polarizing plate 40, and an image sensor 10 disposed to pass through a portion of the display panel 50. The image sensor 10 is disposed inside the polarizing plate 40 to pass through a portion of the polarizing plate 40. A region 40a of the polarizing plate 40 corresponding to the image sensor is a non-image display region. In order to secure a space receiving the image sensor 10 therein, the polarizing plate 40 is machined by a physical punching method. In this case, however, the image display region 40b can provide a poor image due to cracks in a region around a punched region for the region 40a of the polarizing plate 40.

Referring to FIG. 2(B), the optical display device may include a polarizing plate 70, which is formed with a region 70a for operating the image sensor 10 and an image display region 70b, and the region 70a is formed by a chemical or optical method, instead of physical punching of the polarizing plate 40, as shown in FIG. 2(A). In this case, the region 70a corresponds to a non-image display region. In addition, the display panel 50 including the light emitting diodes is divided by the image sensor 10, thereby making it difficult to perform machining and the like.

In recent years, an optical display device including an image sensor disposed at a lower portion thereof is developed in the art, instead of defining a region for the image sensor penetrating a portion of the display panel including the light emitting diodes to secure a space for the image sensor, as shown in FIG. 2(A) and FIG. 2(B). In this case, a region of the polarizing plate corresponding to the image sensor is also required to perform an image display function and to prevent visual observation of the image sensor at the outside in the course of performing the image display function, while providing a clear image in the course of photographing. However, there is a limit to use of a typical polarizing plate in the above optical display device.

The background technique of the present invention is disclosed in Japanese Unexamined Patent Publication No. 2014-081482 and the like.

DISCLOSURE

Technical Problem

It is one aspect of the present invention to provide a polarizing plate, which is applied to an optical display device provided with an image sensor, such as a camera and the like in an image display region thereof, and can perform an image display function through suppression of visual observation of the image sensor at the outside in non-use of the image sensor, while increasing photographing resolution of an image in use of the image sensor.

It is another aspect of the present invention to provide an optical display device including the polarizing plate according to the present invention.

Technical Solution

One aspect of the present invention relates to a polarizing plate.

1. The polarizing plate comprises: a polarizer; and a protective layer formed on at least one surface of the polarizer, and the polarizing plate has a first region and a second region within an image display region, wherein the first region and the second region have different light transmittances at the same wavelength; and wherein the first region has a light transmittance of 50% to 80%, a color value a* of about −13 to about 2, and a color value b* of about 1 to about 35.

2. In 1, the first region may have a degree of polarization of about 25% to about 80%.

3. In 1 and 2, the first region may have an iodine content of about 0.01 wt % to about 5 wt %.

4. In 1 to 3, the first region may have an image display function and an image photographing function.

5. In 1 to 4, the second region may have a light transmittance of about 40% to less than about 50%.

Another aspect of the present invention relates to an optical display device including the polarizing plate according to the present invention.

Advantageous Effects

The present invention provides a polarizing plate, which is applied to an optical display device provided with an image sensor, such as an image sensor, in an image display region thereof and can perform an image display function through suppression of visual observation of the image sensor at the outside in non-use of the image sensor while increasing photographing resolution of an image in use of the image sensor.

The present invention provides an optical display device including the polarizing plate according to the present invention.

DESCRIPTION OF DRAWINGS

FIG. 1 is a sectional view of an optical display device including a polarizing plate according to the present invention.

FIG. 2 is a sectional view of an optical display device including a typical image sensor.

FIG. 3 shows a color coordinate evaluation result of first regions of polarizing plates of Example 1 and Comparative Examples 1 and 2.

BEST MODE

Hereinafter, embodiments of the present invention will be described in detail with reference to the accompanying drawings such that the present invention can be easily implemented by those skilled in the art. It should be understood that the present invention may be embodied in different ways and is not limited to the following embodiments. In the drawings, components unrelated to description are omitted for clear description of the invention and like components will be denoted by like reference numerals throughout the specification. Although lengths, thicknesses or widths of various components may be exaggerated for understanding in the drawings, the present invention is not limited thereto.

Herein, spatially relative terms, such as "upper" and "lower", are defined with reference to the accompanying drawings. Thus, it will be understood that the term "upper surface" can be used interchangeably with the term "lower surface".

Herein, "light transmittance" and "degree of polarization" of a polarizing plate are values measured at a wavelength of about 380 nm to about 780 nm, preferably at a wavelength of about 550 nm. The "light transmittance" means total transmittance, not orthogonal light transmittance.

Herein, with regard to "light transmittance of the first region", the first region has the same light transmittance in an overall region thereof even at the same wavelength. However, when the light transmittance is not the same in the overall region of the first region at the same wavelength, the light transmittance of the first region means average transmittance thereof.

Herein, with regard to "light transmittance of the second region", the second region has the same light transmittance in an overall region thereof even at the same wavelength. However, when the light transmittance is not the same in the overall region of the second region at the same wavelength, the light transmittance of the second region means average transmittance thereof.

Herein, "average transmittance" means an average value of light transmittances in a wavelength range in a region which the average transmittance is to be measured. For example, the average transmittance may be obtained from an average value of light transmittances at a plurality of points arbitrarily designated in a region where the average transmittance is to be measured.

As used herein to represent a specific numerical range, "X to Y" means "greater than or equal to X and less than or equal to Y (X≤ and ≤Y)".

A polarizing plate according to one embodiment of the present invention comprises a polarizer and a protective layer formed on at least one surface of the polarizer. In some embodiments, the polarizing plate includes a polarizer and protective films respectively formed on opposite surfaces of the polarizer. In other embodiments, the polarizing plate may include a polarizer and a protective film formed only on one surface of the polarizer.

The polarizing plate includes a first region and a second region within an image display region. The "image display region" means a region in which an image is displayed on an optical display device provided with the polarizing plate. In the polarizing plate, the image display region may occupy an area ratio of about 90% to about 100%, preferably about 100%. In one embodiment, the polarizing plate may not include a non-image display region.

The first region and the second region have different light transmittances at the same wavelength. Accordingly, while the first region and the second region may perform an image display function, the first region may further perform an external image-photographing function through an image sensor, such as a camera and the like, unlike the second region.

The first region has a light transmittance of about 50% to about 80%. Within this range, the first region can realize the image display function through suppression of visual observation of the image sensor at the outside in non-use of the image sensor while increasing photographing resolution of an image in use of the image sensor. In particular, with the above light transmittance, the first region according to the present invention can realize all of the aforementioned effects in a laminate of the image sensor—a light emitting diode-containing display panel—the polarizing plate in the optical display device. The light emitting diode-containing display panel and the image sensor are sequentially disposed under the first region, whereby the first region can perform both the image display function and the external image-photographing function at the same time. An optical display device according to one embodiment of the present invention will be described below in detail.

The second region performs only an image display function, which is independent of the image display function realized by the image sensor in the optical display device. Accordingly, the second region has lower light transmittance than the first region.

In one embodiment, a difference in light transmittance between the first region and the second region may be in the range of about 5% to about 30%, preferably about 10% to 30%. Within this range, the optical display device including the polarizing plate can realize a uniform image over the entire screen through reduction in image difference between the first region provided with a camera and the second region provided with no camera while preventing the camera from being observed at the outside.

The second region may have a light transmittance of about 40% to less than about 50% (for example, 40%, 41%, 42%, 43%, 44%, 45%, 46%, 47%, 48%, or 49%), specifically about 40% to about 45%. Within this range, the second region can efficiently realize the image display function.

Although the first region and the second region may have the same degree of polarization, it is desirable that the first region have a lower degree of polarization than the second region in consideration of a process of forming the first region described below.

In one embodiment, the first region may have a degree of polarization of about 25% to about 80% (for example, 25%, 30%, 35%, 40%, 45%, 50%, 55%, 60%, 65%, 70%, 75%, or 80%), specifically about 28% to about 70%. Within this range, the first region does not obstruct recognition of an object by the camera. In one embodiment, the second region may have a degree of polarization of about 90% or more, specifically about 90% to 100%. Within this range, the second region can provide an antireflection effect with respect to external light.

Next, the polarizing plate according to the embodiment of the invention will be described with reference to FIG. 1. FIG. 1 is a sectional view of an optical display device including the polarizing plate according to the present invention.

Referring to FIG. 1, a polarizing plate 100 includes a first region 110 and a second region 120.

The entirety of the first region 110 and the second region 120 of the polarizing plate 100 is disposed between a display panel 150 and a cover glass 200. The display panel 150 includes light emitting diodes 152 to display an image. Accordingly, the first region 110 and the second region 120 are included in an image display region.

The optical display device is provided with an image sensor 250 disposed under the display panel 150 and corresponding to the first region 110. Accordingly, the first region 110 can realize the image display function through suppression of visual observation of the image sensor at the outside in non-use of the image sensor 250 while improving photographing resolution of an image through an image photographing function by the image sensor 250 in use of the image sensor 250. With a light transmittance of 50% to 80%, the first region 110 can realize all of the aforementioned effects in a laminate of the image sensor 250—the light emitting diode-containing display panel 150—the polarizing plate 100 in the optical display device.

The first region 110 may occupy an area ratio of 10% or less in the polarizing plate, preferably in the entirety of the first region 110 and the second region 120. Within this range, the first region can provide an image sensor function.

The first region 110 may have a circular, elliptical, angled or amorphous shape, without being limited thereto.

In the polarizing plate, the first region 110 may be placed at any location without limitation and may be placed corresponding to the location of the image sensor 250 in the optical display device.

The first region 110 may allow the effects of the present invention to be more efficiently realized through adjustment in color values a* and b* in the color coordinates. That is, the first region 110 is required to allow an image to be consecutively displayed together with the second region 120, while allowing an image to be more clearly photographed in use of the image sensor. To this end, the light transmittance of the first region 110 is adjusted together with the color values a* and b*.

In one embodiment, the first region may have a color value a* of about −13 to about 2 (for example, −13, −12, −11, −10, −9, −8, −7, −6, −5, −4, −3, −2, −1, 0, 1, or 2), preferably about −10 to about 2, more preferably about −4 to about 2, and a color value b* of about 1 to about 35 (for example, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, or 35), preferably about 15 to about 35, in the color coordinates. Within this range, the first region allows an image to be consecutively displayed together with the second region 120, while allowing an image to be more clearly photographed in use of the image sensor.

The "color coordinates" may be obtained by a color coordinate evaluation method according to CIE 1976 L*a*b* values.

Next, a method of manufacturing the polarizing plate including the first region 110 and the second region 120 according to one embodiment of the invention will be described.

The polarizing plate according to the present invention may be manufactured by preparing a laminate of a polarizer (not formed with a first region and a second region) and a protective layer formed on at least one surface of the polarizer (not formed with the first region and the second region), followed by irradiating a predetermined region of the laminate with pulsed UV laser beams at a wavelength of about 200 nm to about 1,000 nm to form the first region. A region of the laminate not irradiated with the pulsed UV laser beams becomes the second region. Irradiation with the pulsed UV laser beams at a wavelength of about 200 nm to about 1,000 nm can form the first region having a light transmittance of about 50% to about 80% while realizing the above color coordinates.

The polarizer (not formed with the first region and the second region) includes a polyvinyl alcohol film dyed with iodine and/or dichroic dyes and stretched. The polarizer (not formed with the first region and the second region) may have a thickness of about 3 μm to about 50 μm, specifically about 3 μm to about 30 μm. Within this range, the polarizer can be used in the polarizing plate.

The polarizer (not formed with the first region and the second region) may be manufactured by a typical method known to those skilled in the art.

First, the dyed and stretched polyvinyl alcohol film is manufactured.

The dyed and stretched polyvinyl alcohol film may be manufactured through dyeing, stretching, cross-linking, and color correction processes. In the method of manufacturing the polarizer according to the present invention, dyeing and stretching may be performed in any sequence. That is, the polyvinyl alcohol film may be dyed and then stretched or vice versa, or may be simultaneously subjected to dyeing and stretching.

The polyvinyl alcohol film may be a typical polyvinyl alcohol film used in manufacture of a typical polarizer. Specifically, the polyvinyl alcohol film may be a film produced from polyvinyl alcohol or derivatives thereof. The polyvinyl alcohol film may have a degree of polymerization of about 1,000 to about 5,000, a degree of saponification of about 80 mol % to about 100 mol %, and a thickness of about 1 μm to about 30 μm, specifically about 3 μm to about 30 μm. Within this range, the polyvinyl alcohol film can be used in manufacture of a thin polarizer.

The polyvinyl alcohol film may be subjected to washing with water and swelling before dyeing and stretching. The polyvinyl alcohol film may be subjected to washing with water to remove foreign matter from the surface of the polyvinyl alcohol film. The polyvinyl alcohol film may be subjected to swelling to allow more efficient dyeing or stretching of the polyvinyl alcohol film. Swelling may be realized by leaving the polyvinyl alcohol film in an aqueous solution of a swelling bath, as well-known to those skilled in the art. The temperature of the swelling bath and swelling time are not particularly limited. The swelling bath may further include boric acid, an inorganic acid, a surfactant, and the like, and the content of these components may be adjusted.

The polyvinyl alcohol film may be dyed by dipping the polyvinyl alcohol film in a dyeing bath containing iodine and/or dichroic dyes. In the dying process, the polyvinyl alcohol film is dipped in a dyeing solution, which may be an aqueous solution containing iodine and/or dichroic dyes. Specifically, iodine is provided in the form of an iodine-based dye. The iodine-based dye may include at least one selected from among potassium iodide, hydrogen iodide, lithium iodide, sodium iodide, zinc iodide, lithium iodide, aluminum iodide, lead iodide, and copper iodide. The dying solution may be an aqueous solution containing about 1 wt % to about 5 wt % of iodine and/or dichroic dyes. Within this range, the polarizer has a degree of polarization within a predetermined range to be used in a display device.

The dyeing bath may have a temperature of about 20° C. to about 45° C. and the polyvinyl alcohol film may be dipped in the dyeing bath for about 10 seconds to about 300 seconds. Within this range, it is possible to realize a polarizer having a high degree of polarization.

The dyed polyvinyl alcohol film may be stretched in a stretching bath to exhibit polarization through alignment of iodine and/or dichroic dyes. Specifically, stretching may be realized by dry stretching and wet stretching. Dry stretching may be performed by inter-roll stretching, compression stretching, hot-roll stretching, and the like, and wet stretching may be performed in a wet stretching bath containing water at about 35° C. to about 65° C. The wet stretching bath may further contain boric acid to improve the stretching effect.

The polyvinyl alcohol film may be stretched at a certain stretching ratio, specifically a total stretching ratio of about 5 times to about 7 times, more specifically about 5.5 times to about 6.5 times. Within this range, the polyvinyl alcohol film can prevent cutting, wrinkling and the like upon stretching, and can realize a polarizer achieving improvement in polarization degree and transmittance. Stretching may be performed by uniaxial stretching through single-stage stretching or multi-stage stretching, such as bi-stage stretching and tri-stage stretching, thereby preventing fracture of the polyvinyl alcohol film in manufacture of a thin polarizer.

Although dyeing and stretching of the polyvinyl alcohol film are performed in the stated sequence in the above embodiment, dyeing and stretching may be performed in the same reaction bath.

Before or after the dyed polyvinyl alcohol film is stretched, the polyvinyl alcohol film may be subjected to crosslinking in a crosslinking bath. Crosslinking is a process that allows the polyvinyl alcohol film to be more strongly dyed with iodine and/or dichroic dyes, and may be performed using boric acid as a crosslinking agent. In order to enhance the crosslinking effect, the crosslinking bath may further contain a phosphoric acid compound, potassium iodide, or the like.

The dyed and stretched polyvinyl alcohol film may be subjected to color correction in a color correction bath. In color correction, the dyed and stretched polyvinyl alcohol film is dipped in the color correction bath filled with a color correction solution containing potassium iodide. As a result, the polarizer has reduced color values and iodine cations (I) are removed from the polarizer, thereby improving durability. The color correction bath may have a temperature of about 20° C. to about 45° C. and the polyvinyl alcohol film may be dipped therein for about 10 seconds to about 300 seconds.

Next, the laminate is manufactured by forming a protective layer on at least one surface of the dyed and stretched polyvinyl alcohol film. The protective layer may be manufactured by a typical method known to those skilled in the art.

The protective layer is formed on at least one surface of the polarizer and may be a photocurable coating layer or protective film.

The protective film may be a typical protective film used as a protective film for polarizers. By way of example, the protective film may include a protective film formed of at least one resin selected from among cellulose resins including triacetylcellulose and the like, polyester resins including polyethylene terephthalate, polybutylene terephthalate, polyethylene naphthalate, polybutylene naphthalate, and the like, cyclic polyolefin resins, polycarbonate resins, polyether sulfone resins, polysulfone resins, polyamide resins, polyimide resins, polyolefin resins, polyarylate resins, polyvinyl alcohol resins, polyvinyl chloride resins, and polyvinylidene chloride resins. The protective film may have a thickness of about 10 μm to about 100 μm, for example, about 10 μm to about 60 μm. Lamination may be performed using a bonding agent by a typical method known to those skilled in the art.

Thereafter, the first region is formed by irradiating a predetermined region of the laminate with pulsed UV laser beams at a wavelength of about 200 nm to about 1,000 nm.

The pulsed UV laser beams in the wavelength range of about 200 nm to about 1,000 nm decompose iodine and the dichroic dyes in the polarizer through transfer of iodine and the dichroic dyes from a ground state to an excited state, thereby improving light transmittance in the region irradiated therewith.

However, even after irradiation with the pulsed UV laser beams in the wavelength range of about 200 nm to about 1,000 nm, dichroic substances, such as iodine and dichroic dyes, are present in the region of the polarizer corresponding to the first region.

In one embodiment, the first region may have an iodine content of about 0.01 wt % to about 5 wt % (for example, 0.01 wt %, 0.02 wt %, 0.03 wt %, 0.04 wt %, 0.05 wt %, 0.06 wt %, 0.07 wt %, 0.08 wt %, 0.09 wt %, 0.1 wt %, 0.2 wt %, 0.3 wt %, 0.4 wt %, 0.5 wt %, 0.6 wt %, 0.7 wt %, 0.8 wt %, 0.9 wt %, 1 wt %, 2 wt %, 3 wt %, 4 wt %, or 5 wt %), specifically about 0.01 wt % to about 1 wt %. Within this range, the first region can improve transmittance while minimizing dichroism. The "iodine content" may mean the content of all iodine-containing substances including iodine ($I_2$) and iodine ions ($I^-$, $I_3^-$, $I_5^-$, and the like).

The present invention is different from a typical method of increasing light transmittance above about 80% by completely removing dichroic substances, such as iodine and dichroic dyes, in the polarizer through treatment of the polarizer with an acid or alkali solution in the art. In addition, the present invention is distinguished from a typical method of forming a region having high light transmittance on the polarizer through treatment of the polarizer with femtosecond laser beams or nanosecond laser beams in the art, in that post-processing is not required after irradiation and the border between the first region and the second region is clear.

Specifically, irradiation may be performed using pulsed laser beams in the wavelength range of about 200 nm to about 1,000 nm, preferably about 200 nm to about 800 nm.

The pulsed laser beams in the wavelength range of about 200 nm to about 1,000 nm may be emitted at a voltage of about 400 V to about 750 V. The pulsed laser beams in the wavelength range of about 200 nm to about 1,000 nm may be emitted at a pulse period of 300 μs to about 600 μs (time for one time irradiation). The pulsed laser beams in the wavelength range of about 200 nm to about 1,000 nm may be emitted at an energy density of about 2.0 J/cm² to about 5.0 J/cm². The pulsed laser beams in the wavelength range of about 200 nm to about 1,000 nm may be emitted at an intensity of about 5 kw/cm² to about 30 kw/cm² upon irradiation once. Within this range, the first region can achieve a light transmittance of about 50% to about 80% without carbonization of a processed surface of the polarizer by heat. The "energy density" means irradiation energy per pulse per unit area in a region of the polarizer having high light transmittance.

In one embodiment, irradiation with the pulsed laser beams in the wavelength range of about 200 nm to about 1,000 nm at a pulse period of about 460 μs may be performed for about 0.4 seconds to about 400 seconds, for example, for about 1 second to about 40 seconds. Within this range, it is possible to form a neutral colorless region having high transmittance through increase in irradiation time or the number of irradiation times under the above conditions without thermal deformation of the polarizer and the protective film.

Irradiation with the pulsed laser beams in the wavelength range of about 200 nm to about 1,000 nm may be performed one time to 20 times. Within this range, it is possible to form a neutral colorless region having high transmittance through increase in irradiation time or the number of irradiation times under the above conditions without thermal deformation of the polarizer and the protective film.

The polarizer formed with the first region and the second region may have a thickness of about 3 μm to about 50 μm, specifically about 3 μm to about 30 μm. Within this range, the polarizer can be used in the polarizing plate.

Next, a method of manufacturing the polarizing plate including the first region 110 and the second region 120 according to another embodiment of the invention will be described.

The polarizing plate according to the present invention may be manufactured by irradiating a predetermined region of a polarizer (not formed with a first region and a second region) with pulsed UV laser beams at a wavelength of about 200 nm to about 1,000 nm to form the first region, followed by forming a protective layer on at least one surface of the polarizer. The predetermined region of the polarizer irradiated with the pulsed UV laser beams becomes the first region and a region of the polarizer not irradiated with the pulsed UV laser beams becomes the second region. The method according to this embodiment is substantially the same as the method according to the above embodiment except that the polarizer (not formed with the first region and the second region) is irradiated with the pulsed UV laser beams instead of irradiating the laminate of the polarizer and the protective layer therewith.

Next, an optical display device according to one embodiment of the invention will be described.

The optical display device according to the present invention includes the polarizing plate according to the present invention. The optical display device may include an organic light emitting diode display, and the like.

The optical display device according to the present invention will be described in more detail with reference to FIG. 1.

Referring to FIG. 1, the optical display device includes a display panel 150, which includes a base layer 151 and light emitting diodes 152, a polarizing plate 100 formed on the display panel 150, a cover glass 200 formed on the polarizing plate 100, and an image sensor 250 disposed under the display panel 150.

The polarizing plate 100 includes a first region 110 and a second region 120. The polarizing plate includes the polarizing plate according to the present invention. Both the first region 110 and the second region 120 constitute image display regions of the optical display device.

The first region 110 is less densely provided with the light emitting diodes 151 than the second region 120. With this structure, the first region can realize an image display function through the image sensor 250 while realizing an image display function through the display panel 150.

The image sensor 250 is disposed under the first region 110. The image sensor 250 may include a camera, without being limited thereto.

Next, the present invention will be described in more detail with reference to some examples. However, it should be noted that these examples are provided for illustration only and are not to be construed in any way as limiting the invention.

Details of components used in Examples and Comparative Examples are as follows.

(1) Material of polarizer: Polyvinyl alcohol film (VF-PE3000, thickness: 30 μm, Kuraray Co., Ltd., Japan)
    (2) Protective film: Triacetylcellulose film (KC4UYW, thickness: 40 μm, Konica Co., Ltd., Japan)

Example 1

A polyvinyl alcohol film washed with water was subjected to swelling treatment in a swelling bath filled with water at 30° C.

After swelling treatment, the polyvinyl alcohol film was dyed with an aqueous solution containing 3 wt % of potassium iodide in a dyeing bath at 30° C. for 30 seconds to 200 seconds. The dyed polyvinyl alcohol film was passed through a wet crosslinking bath filled with an aqueous solution containing 3 wt % of boric acid at 30° C. to 60° C. Thereafter, the polyvinyl alcohol film was stretched in an aqueous solution containing 3 wt % of boric acid at 50° C. to 60° C. to reach a total stretching ratio of 6 times an initial length thereof, thereby producing a polarizer. A laminate was prepared by bonding protective films to both surfaces of the prepared polarizer using a bonding agent (Z-200, Nippon Goshei Co., Ltd.).

The laminate was cut to a predetermined size and a target region for a first region of the laminate was irradiated with pulsed UV laser beams at a wavelength of 200 nm to 800 nm under the conditions set forth in Table 1, thereby fabricating a polarizing plate formed with the first region. A region of the polarizing plate not irradiated with the pulsed UV laser beams became a second region.

Examples 2 to 4

Polarizing plates each having a first region and a second region were fabricated in the same manner as in Example 1 except that conditions for irradiation with pulsed UV laser beams were changed, as listed in Table 1.

Comparative Example 1

A polarizing plate having a first region and a second region was fabricated in the same manner as in Example 1 except that conditions for irradiation with pulsed UV laser beams were changed, as listed in Table 2.

Comparative Example 2

A polarizing plate having a first region and a second region was fabricated in the same manner as in Example 1 except that conditions for irradiation with pulsed UV laser beams were changed, as listed in Table 2.

Comparative Example 3

A polarizing plate was fabricated in the same manner as in Example 1 except that the first region was formed by a chemical method. The protective film was removed from the polarizing plate of Example 1 and a surface mask having a circular through-hole having a diameter of 50 mm was bonded to an exposed surface of the polarizer. The polarizer was dipped in 5 mol/L of aqueous sodium hydroxide solution (aqueous alkali solution) for 7 seconds. Thereafter, the polarizer was dipped in 0.1 m/l hydrochloric acid. The resulting product was dried in an oven at 60° C., followed by removing the surface mask therefrom. As a result, a polarizer having a first region was fabricated. A polarizing plate was fabricated by bonding a PET film having a 5 μm thick adhesive layer as a surface protective film to the polarizer. In the polarizing plate, the first region has a light transmittance of 91.71%. Even with a different aqueous alkali solution, a polarizing plate having a light transmittance of greater than 80% was obtained.

Comparative Example 4

A polarizing plate was fabricated in the same manner as in Example 1 except that a first region was formed by punching a corresponding portion of the polarizing plate using a laser cutter.

The polarizing plates fabricated in Examples and Comparative Examples were evaluated as to the following properties and evaluation results are shown in Tables 1 and 2 and FIG. 3.

(1) Light transmittance of first region and second region (unit: %): Light transmittance was measured at a wavelength of 550 nm on each of the first region and the second region of each of the polarizing plates fabricated in Examples and Comparative Examples using a JASCO V730.

(2) Degree of polarization of first region and second region (unit: %): The degree of polarization was measured at a wavelength of 550 nm on each of the first region and the second region of each of the polarizing plates fabricated in Examples and Comparative Examples using a JASCO V730.

(3) Color values a* and b* in color coordinates of first region: Color values were measured on the first region of each of the polarizing plates fabricated in Examples and Comparative Examples using a UV-VIS spectrophotometer V7100 (JASCO).

(4) Visual observation of camera and image resolution of camera: With a camera disposed under the first region of each of the polarizing plates, visual observation of the camera and an image resulting therefrom were observed above the polarizing plate. A polarizing plate providing a difference in the degree of polarization between the first region and the second region without visual observation of a camera lens while providing a high resolution image through the camera was rated as ◎, a polarizing plate allowing observation of a camera lens while providing a high resolution image through the camera was rated as X1, and a polarizing plate providing no difference in the degree of polarization between the first region and the second region and a poor resolution image through the camera was rated as X2.

TABLE 1

| | | Example | | | |
|---|---|---|---|---|---|
| | | 1 | 2 | 3 | 4 |
| Voltage (V) | | 606 | 606 | 535 | 535 |
| Pulse period (μs, time upon irradiation once) | | 300 | 300 | 460 | 460 |
| Laser Intensity (kW/cm$^2$) upon irradiation once | | 13 | 13 | 8.7 | 8.7 |
| Irradiation energy density (J/cm$^2$) | | 3.31 | 3.31 | 3.77 | 3.77 |
| Number of irradiation times (number) | | 1 | 8 | 1 | 8 |
| Irradiation cycle (Hz) | | — | 0.125 | — | 0.125 |
| Light transmittance | First region | 56.68 | 59.23 | 62.32 | 66.38 |
| | Second region | 43.24 | 43.24 | 43.24 | 43.24 |
| Degree of polarization | First region | 55.45 | 50.12 | 30.45 | 28.85 |
| | Second region | 99.99 | 99.99 | 99.99 | 99.99 |
| Color | a* | 1.83 | 1.26 | −2.29 | −2.01 |

TABLE 1-continued

| | | Example | | | |
|---|---|---|---|---|---|
| | | 1 | 2 | 3 | 4 |
| coordinates of first region | b* | 20.58 | 19.52 | 28.15 | 27.71 |
| Visual observation and image resolution | | ◎ | ◎ | ◎ | ◎ |

TABLE 2

| | | Comparative Example | | | |
|---|---|---|---|---|---|
| | | 1 | 2 | 3 | 4 |
| Voltage (V) | | 950 | 400 | — | — |
| Pulse period (μs, time upon irradiation once) | | 50 | 700 | — | — |
| Laser Intensity (kW/cm$^2$) upon irradiation once | | 40 | 3.2 | — | — |
| Irradiation energy density (J/cm$^2$) | | 1.89 | 5.51 | — | — |
| Number of irradiation times (number) | | 1 | 8 | — | — |
| Irradiation cycle (Hz) | | — | 0.125 | — | — |
| Light transmittance | First region | 44.21 | 84.91 | — | — |
| | Second region | 43.24 | 43.24 | 43.24 | 43.24 |
| Degree of polarization | First region | 97.05 | 20.18 | 0.1073 | — |
| | Second region | 99.99 | 99.99 | 99.99 | 99.99 |
| Color coordinates of first region | a* | −0.98 | −1.31 | −0.48 | — |
| | b* | 3.18 | 11.06 | 1.44 | — |
| Visual observation and image resolution | | X2 | X1 | X1 | X1 |

As shown in Table 1, when applied to an optical display device, the polarizing plate according to the present invention could perform an image display function through suppression of visual observation of an image sensor at the outside in non-use of the image sensor while increasing resolution of an image in use of the image sensor. In addition, as shown in FIG. 3, since the first region was not easily observed with the naked eye during output of a black screen, the polarizing plate according to the present invention did not suffer from failure of the image display function. Referring to FIG. 3, which shows three circular color-coordinate evaluation images, the leftmost image is an evaluation result of the polarizing plate fabricated in Example 1.

Conversely, as shown in Table 2, although the polarizing plate of Comparative Example 1 including the first region having light transmittance outside light transmittance according to the present invention did not allow observation of the image sensor, the polarizing plate had a problem in that the image sensor failed to recognize external light. As shown in FIG. 3, the polarizing plates of Comparative Examples 1 and 2 allowed the first region to be easily observed during output of a black screen. In addition, the polarizing plate of Comparative Example 3 formed with a high light transmittance region by a typical chemical method and the polarizing plate of Comparative Example 4 adopting a typical punching method did not provide the effects of the present invention.

It should be understood that various modifications, changes, alterations, and equivalent embodiments can be made by those skilled in the art without departing from the spirit and scope of the present invention.

The invention claimed is:

1. A polarizing plate comprising: a polarizer; and a protective layer formed on at least one surface of the polarizer, the polarizing plate comprising a first region and a second region within an image display region, wherein the first region and the second region have different light transmittances at the same wavelength, wherein the first region has a light transmittance of about 50% to about 80%, a color value a* of about −13 to about 2, and a color value b* of about 1 to about 35, wherein the combination of the light transmittance and the color values allows an image to be consecutively displayed together with the second region while allowing an image to be more clearly photographed when using an image sensor; and wherein the first region has a degree of polarization of 25% to about 80%, and wherein the degree of polarization in combination with the light transmittance and the color values enables the first region to perform both an image display function and an image photographing function.

2. The polarizing plate according to claim 1, wherein the first region has an iodine content of about 0.01 wt % to about 5 wt %.

3. An optical display device comprising the polarizing plate according to claim 2.

4. The polarizing plate according to claim 1, wherein the first region has an image display function and an image photographing function, and wherein the combination of the light transmittance and the color values enables suppression of visual observation of an image sensor disposed under the first region when the image sensor is not in use, while enabling clear photographing when the image sensor is in use.

5. An optical display device comprising the polarizing plate according to claim 4.

6. The polarizing plate according to claim 1, wherein the second region has a light transmittance of about 40% to less than about 50%.

7. An optical display device comprising the polarizing plate according to claim 5.

8. An optical display device comprising the polarizing plate according to claim 1.

9. The polarizing plate according to claim 1, wherein the first region has a color value b* of about 5 to about 35, wherein the refined range of the color value b* in combination with the light transmittance and the color value a* further enhances consecutive image display together with the second region while maintaining clear image photographing capability.

10. An optical display device comprising the polarizing plate according to claim 9.

11. The polarizing plate according to claim 9, wherein the first region has a color value b* of 15 to about 35.

12. An optical display device comprising the polarizing plate according to claim 11.

* * * * *